(12) United States Patent
Nakamura (10) Patent No.: US 6,245,182 B1
(45) Date of Patent: *Jun. 12, 2001

(54) TRANSFER MATERIAL, SURFACE-PROTECTIVE SHEET, AND PROCESS FOR PRODUCING MOLDED ARTICLE

(75) Inventor: Yuzo Nakamura, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/284,285

(22) PCT Filed: Aug. 7, 1998

(86) PCT No.: PCT/JP98/03531

§ 371 Date: Apr. 12, 1999

§ 102(e) Date: Apr. 12, 1999

(87) PCT Pub. No.: WO99/07535

PCT Pub. Date: Feb. 18, 1999

(30) Foreign Application Priority Data

Aug. 12, 1997 (JP) .................................................... 9-231821

(51) Int. Cl.[7] .............................. B05C 1/16; B29C 47/00; B29C 31/04; B32B 31/28; B32B 27/08
(52) U.S. Cl. .......................... 156/230; 156/212; 156/245; 156/273.7; 427/146; 428/515; 264/135; 264/259; 264/548
(58) Field of Search ..................................... 156/230, 240, 156/237, 238, 241, 244.11–244.17, 247, 277, 289, 285, 298, 300, 212, 245, 273.7; 427/146, 147, 148; 428/467, 421, 515; 264/132, 135, 267, 269, 513, 548, 259

(56) References Cited

U.S. PATENT DOCUMENTS

| | | | | |
|---|---|---|---|---|
| 4,369,157 | * | 1/1983 | Conner | 264/246 |
| 5,639,536 | * | 6/1997 | Yamazaki et al. | 428/141 |
| 5,993,588 | * | 11/1999 | Nakamura | 156/212 |

FOREIGN PATENT DOCUMENTS

| | | | | |
|---|---|---|---|---|
| 56-146717A | * | 11/1981 | (JP) | B29C/23/00 |
| 02261614A | * | 10/1990 | (JP) | B29C/45/14 |
| 3-114717 | | 5/1991 | (JP) . | |
| 4-166311 | | 6/1992 | (JP) . | |
| 8-9198 | | 1/1996 | (JP) . | |
| 9-57792 | | 3/1997 | (JP) . | |

* cited by examiner

Primary Examiner—Richard Crispino
Assistant Examiner—J. A. Lorengo
(74) Attorney, Agent, or Firm—Wenderoth, Lind & Ponack, L.L.P.

(57) ABSTRACT

The present invention provides a transfer material and surface protecting sheet which can provide a molded article excellent in abrasion resistance and chemical resistance without causing crack in curved part of the molded article. The present invention can make possible not to remain fluidity and stickiness on a protecting printed layer prior to irradiation with an active energy ray, even in an inline printing process. A transfer material or a surface protecting sheet of the present invention has, a substrate sheet, a protecting printed layer which consists of an active energy ray curable resin composition comprising a polyaddition reaction product having an urethane bond amount of from 6000 to 50000 g/eq as an effective ingredient on a surface of the substrate sheet, and an additional printed layer on the protecting printed layer or on the opposite surface of the substrate sheet.

13 Claims, 4 Drawing Sheets

TRANSFER MATERIAL, SURFACE-PROTECTIVE SHEET, AND PROCESS FOR PRODUCING MOLDED ARTICLE

This application is a 371 application of International Application No. PCT/JP98/03531 filed Aug. 7, 1998.

TECHNICAL FIELD

The present invention relates to a transfer material and surface protecting sheet which can provide a molded article excellent in abrasion resistance and chemical resistance without causing crack in curved part of the molded article, and to a method for producing a molded article excellent in abrasion resistance and chemical resistance by using the same. The present invention can make possible not to remain fluidity and stickiness on a protecting printed layer prior to irradiation with an active energy ray, even in an inline printing process.

PRIOR ART

As a method for producing a molded article excellent in abrasion resistance and chemical resistance, there are conventionally a method in which a transfer material obtained by providing a protecting printed layer composed of an active energy ray curable resin composition, on one releasing surface of a substrate sheet, and providing an additional layer such as a picture printed layer, an adhesive printed layer and the like, on the protecting printed layer, is adhered on a surface of a molded article, and the substrate sheet is released; or a method in which a surface protecting sheet obtained by providing a protecting printed layer composed of an active energy ray curable resin composition, on one no-releasing surface of a substrate sheet, and providing an additional layer such as a picture printed layer, an adhesive printed layer and the like, on the opposite surface of the substrate sheet, is adhered on the surface of a molded article, and the like.

However, in the method for producing a molded article excellent in abrasion resistance and chemical resistance, if an active energy ray curable resin composition of the sheet material such as a transfer material and a surface protecting sheet, is crosslinked and cured (pre-cured) by irradiation with an active energy ray prior to use, cracks easily occur in a protecting printed layer situated curved part of the molded article on adhering the sheet material to the molded article.

On the other hand, if irradiation with an active energy ray is not conducted in producing a sheet material but is conducted after adhesion of the sheet material to the molded article (after-cure), occurrence of crack in the protecting printed layer can be prevented, however, the following problems occur in the protecting printed layer prior to irradiation with an active energy ray.

Figure 9:
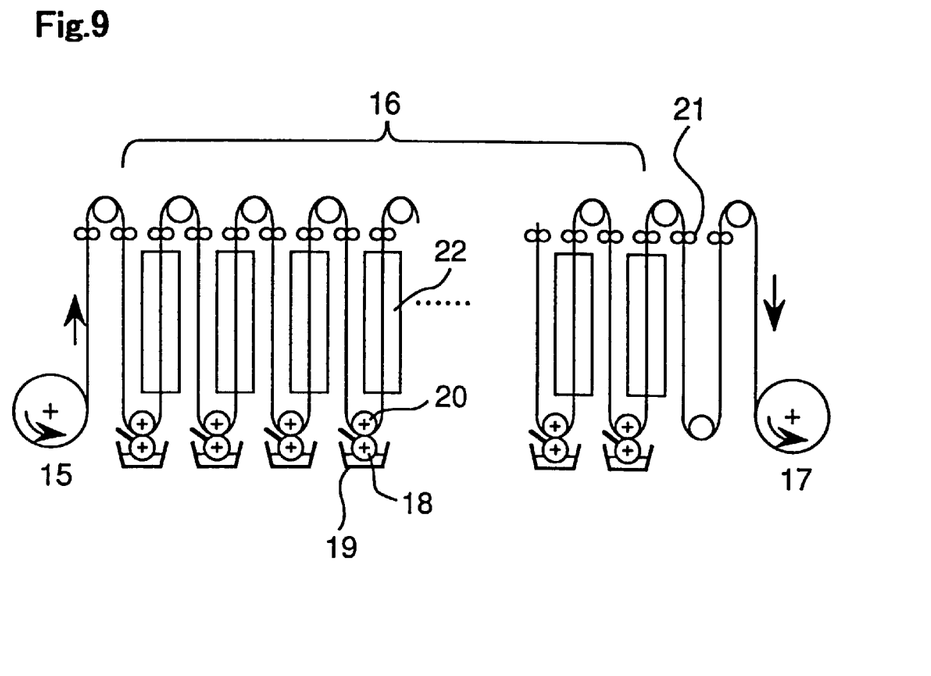
FIG. 9 is a schematic view which shows a general multi-colour rotogravure printing apparatus.

In general, for forming various printed layers continuously on a sheet, a conventional multi-colour rotogravure printing machine as shown in FIG. 9 and the like are used. Main flow in such a machine is as follows: A sheet to be printed is continuously fed out from winding off part 15, then, first, in the first printing unit of multi-colour rotogravure printing part 16, the sheet is passed between rotary plate cylinder 18 the surface on which ink being supplied from ink pan 19, and impression cylinder 20 which applies pressure to the plate cylinder 18, and the ink is transferred on the sheet to form a printed layer. The sheet subsequently is passed through drying part 22 which comprises a steam drum, hot wind, cold wind, and/or the like to dry the printed layer. The sheet is then carried to the next printing unit, and another printed layer is formed on the sheet in the same manner as in the above-described printing unit. The above described procedure is repeated several times with optionally changing the surface on which the printed layer is formed, and the sheet is wound up at a winding up part 17 after all the printed layers are formed. In this machine, tension of the sheet may be properly controlled at the location of guide rolls 21.

A printed layer such as a picture printed layer, adhesive printed layer, and the like, generally loses fluidity and stickiness when it passes through the drying part 22 of the printing units. However, a protecting printed layer composed of a conventional active energy ray curable resin composition keeps fluidity and stickiness after such degree of drying. The reason for this is that the above-described drying part 22 has a length as short as 2 m, and the heating temperature thereof is low. Further reason is that the passing speed of the sheet through the drying part 22 is fixed based on printing speed of the printed layer, for example, a printing speed of 40 m/minute, and the period during which the protecting printed layer is heated in the drying part 22 is as short as about 3 seconds.

As a result, in the case of preparing a transfer material, the ink for forming a protecting printed layer once transferred on a substrate sheet may move to a guide roll 21 of the printing machine, or the ink for forming a picture printed layer, or for forming a adhesive printed layer and the like, may not be successfully transferred on a protecting printed layer by plate cylinder 18, and the ink for forming a protecting printed layer once transferred on a substrate sheet may be reversely transferred to the plate cylinder 18 which forms the picture printed layer, adhesive printed layer and the like. That is, what is called back trap may occur.

In the case of preparing a surface protecting sheet, likewise, the ink for forming a protecting printed layer once transferred on a substrate sheet may move to a guide roll 21 of the printing machine. Since a protecting printed layer is provided on one surface of a substrate sheet having no releasing property and a picture printed layer, an adhesive printed layer and the like are provided on the opposite surface in this case, the ink for forming a protecting printed layer once transferred on a substrate sheet may move to a surface of the picture printed layer, adhesive printed layer or the like when the surface protecting sheet is wound up at winding up part 17 after all the printed layers are formed.

Figure 10:
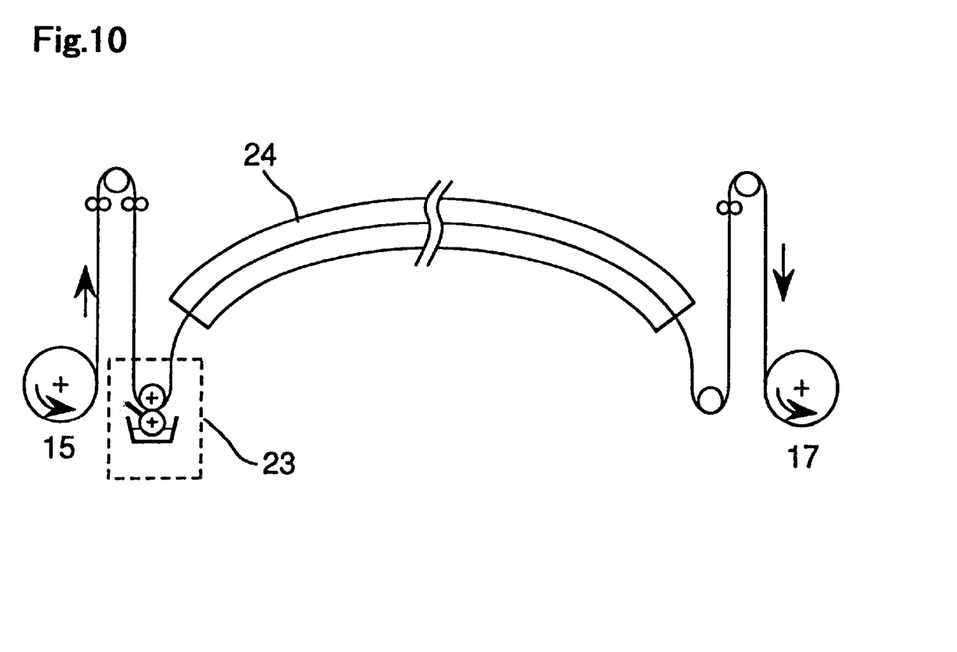
FIG. 10 is a schematic view which shows a printing apparatus for forming a protecting printed layer composed of a conventional active energy curable resin composition so that fluidity and stickiness do not remain.

Therefore, especial drying is required for the protecting printed layer after formation of the protecting printed layer in production process of the sheet material, in order to prevent occurrence of crack in the protecting printed layer situated on curved part of a molded article, and in order to prevent remaining of fluidity and stickiness on the protecting printed layer prior to irradiation with an active energy ray, when the transfer material or the surface protecting sheet is adhered to a molded article. For example, a printing system for use in a protecting printed layer as shown in FIG. 10 have to be designed and constructed. A sheet to be printed is continuously fed out from winding off part 15, then, first, ink is transferred onto a sheet to form a protecting printed layer at rotogravure printing part 23 for a protecting printed layer, subsequently, the protecting printed layer is dried with passing through drying part for a protecting printed layer 24 which has a length of 10 to 30 m and can raise temperature up to near 200° C. until it loses fluidity and stickiness, then, the sheet was once wound up at winding up part 17. In this case, the printing speed can widely be controlled depending on drying property of the protecting printed layer because the printing system is independent of those for the other printed layers. The resulting wound sheet is then set again on winding off part 15 of the conventional multi-colour rotogravure printing machine as shown in FIG. 9, and an additional printed layer is formed.

However, the transfer material and the surface protecting sheet are produced by using the especial drying step for the protecting printed layer as described above, thus the sheet have to be once detached from the line after formation of the protecting printed layer 2, and prior to formation of the other printed layer. The procedure therefore becomes troublesome. Further, the printing apparatus for forming the protecting printed layer have to be separately designed and constructed in the case of producing the transfer material or the surface protecting sheet. A cost for the apparatus is therefore required. Moreover, a running cost becomes high since a plurality of apparatuses are necessary, by comparison with the case in which only a conventional multi-colour rotogravure printing machine is used.

Therefore, the object of the present invention is to provide a transfer material and a surface protecting sheet excellent in abrasion resistance and chemical resistance which can remove the above-described problems, that is, can cause no crack in a protecting printed layer situated on curved part of a molded article, and can prevent remaining of fluidity and stickiness in the protecting printed layer prior to irradiation with an active energy ray even in an inline printing process, and to provide a method for producing a molded article excellent in abrasion resistance and chemical resistance by using the same.

SUMMARY OF THE INVENTION

The present inventors have intensively studied to solve the above described problems, and found that the problems can be solved by the following constructions:

A transfer material excellent in abrasion resistance and chemical resistance which comprises a substrate sheet having releasing property, a protecting printed layer formed on a releasing surface of the substrate sheet, and at least one additional printed layer on the protecting printed layer, wherein the protecting printed layer consists of an active energy ray curable resin composition which comprises a reaction product having an urethane bond amount of from 6000 to 50000 g/eq as an effective ingredient, the reaction product being obtained by poly-adding a polymer having a (meth)acryl equivalent weight of from 100 to 300 g/eq, a hydroxyl value of from 20 to 500, and a weight-average molecular weight of from 5000 to 50000, to a polyfunctional isocyanate;

In the transfer material, the polymer may be a reaction product of poly-addition reaction between glycidyl (meth) acrylate-based polymer, and α, β-unsaturated monocarboxylic acid;

In the transfer material, the glycidyl (meth)acrylate-based polymer may be a homopolymer of glycidyl (meth)acrylate, or a copolymer of glycidyl (meth)acrylate and an α, β-unsaturated monomer having no carboxyl group;

In the transfer material, the substrate sheet may have a partial matting layer on the surface thereof, the partial matting layer comprising an epoxide resin, a melamine resin, the copolymer or the mixture thereof, as an effective ingredient, and comprising an acidic catalyst.

A method for producing a molded article excellent in abrasion resistance and chemical resistance comprising the steps of:

adhering the protecting printed layer of the above described transfer material onto a surface of a molded article;

releasing the substrate sheet; and irradiating with an active energy ray.

A method for producing a molded article excellent in abrasion resistance and chemical resistance comprising the steps of:

placing the above described transfer material in a mold with the protecting printed layer thereof facing inside;

injecting a resin into cavity for filling, molding and simultaneously adhering the protecting printed layer of the transfer material to the surface of the molded resin;

releasing the substrate sheet; and irradiating with an active energy ray.

A surface protecting sheet excellent in abrasion resistance and chemical resistance which comprises a substrate sheet having no releasing property, a protecting printed layer formed on a surface of the substrate sheet, and at least one additional printed layer on the opposite surface of the substrate sheet, wherein the protecting printed layer consists of an active energy ray curable resin composition which comprises a reaction product having an urethane bond amount of from 6000 to 50000 g/eq as an effective ingredient, the reaction product being obtained by poly-adding a polymer having a (meth)acryl equivalent weight of from 100 to 300 g/eq, a hydroxyl value of from 20 to 500, and a weight-average molecular weight of from 5000 to 50000, to a polyfunctional isocyanate.

In the surface protecting sheet, the polymer is a reaction product of poly-addition reaction between glycidyl a (meth) acrylate-based polymer, and α, β-unsaturated monocarboxylic acid.

In the surface protecting sheet, the glycidyl (meth) acrylate-based polymer is a homopolymer of glycidyl (meth) acrylate, or a copolymer of glycidyl (meth)acrylate and an α, β-unsaturated monomer having no carboxyl group.

A method for producing a molded article excellent in abrasion resistance and chemical resistance comprising the steps of:

placing the above described surface protecting sheet on the surface of a molded article;

heating and softening the surface protecting sheet;

vacuum attracting the protecting sheet from the downward direction to adhere the surface protecting sheet onto the surface of the molded article; and irradiating with an active energy ray.

A method for producing a molded article excellent in abrasion resistance and chemical resistance comprising the steps of:

placing the above described surface protecting sheet in a mold with the protecting printed layer thereof facing outside;

injecting a resin into cavity for filling, molding and simultaneously adhering the surface protecting sheet to the surface of the molded resin; and irradiating with an active energy ray.

BRIEF DESCRIPTION OF THE DRAWINGS

In the figures, 1 is a substrate sheet; 2 is a protecting printed layer; 3 is a picture printed layer; 4 is an adhesive printed layer; 5 is a transfer layer; 6 is a transfer material; 7 is a molded article; 8 is a heat resistant rubber-like elastomer; 9 is a movable mold; 10 is a fixed mold; 11 is a molten resin; 12 is a surface protecting sheet; 13 is a heater; 14 is vacuum suction; 15 is a winding off part; 16 is a multi-colour rotogravure printing part; 17 is a winding up part; 18 is a plate cylinder; 19 is an ink pan; 20 is an impression cylinder; 21 is guide rolls; 22 is a drying part; 23 is a rotogravure printing part; 24 is a drying part for a protecting printed layer.

DETAILED DESCRIPTION OF THE INVENTION

First, transfer material 6 of the present invention will be described.

Figure 1:
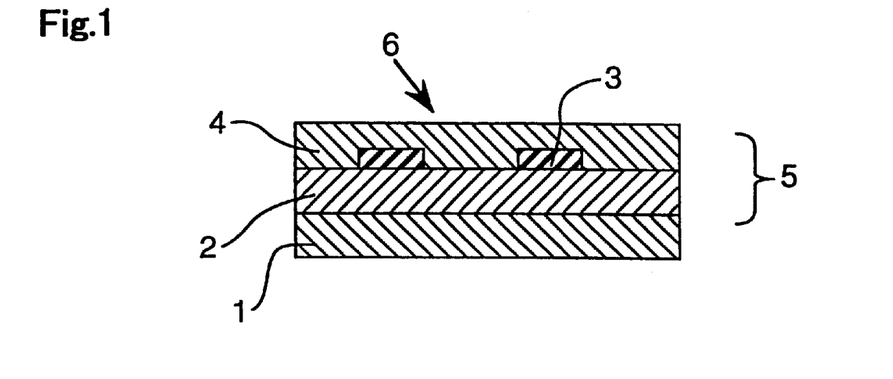
FIG. 1 is a schematic sectional view which shows one example of the transfer material according to the present invention.

Transfer material 6 shown in FIG. 1 comprises substrate sheet 1 having releasing property, protecting printed layer 2 formed on a releasing surface of the substrate sheet, and an additional printed layer such as picture printed layer 3 and adhesive printed layer 4 on the protecting printed layer 2. The protecting printed layer consists of an active energy ray curable resin composition which comprises a reaction product having an urethane bond amount of from 6000 to 50000 g/eq as an effective ingredient. The reaction product is obtained by poly-adding a polymer having a (meth)acryl equivalent weight of from 100 to 300 g/eq, a hydroxyl value of from 20 to 500, and a weight-average molecular weight of from 5000 to 50000, to a polyfunctional isocyanate. The reaction product is reacted prior to printing the protecting printed layer.

As the substrate sheet 1 having releasing property, there can be used any material which is usually used as a substrate sheet of a transfer material, such as a sheet of a polypropylene-based resin, polyethylene-based resin, polyamide-based resin, polyester-based resin, polyacryl-based resin, polyvinyl chloride-based resin or the like, a metal foil such as an aluminum foil, copper foil or the like, a glassine paper, a coat paper, a cellulose-based sheet such as cellophane or the like, a composite of the above-described sheets, or the like.

If the releasing property of transfer layer 5 composed of the protecting printed layer 2, picture printed layer 3, adhesive printed layer 4 from the substrate sheet 1 is excellent, the transfer layer 5 may be applied directly on the substrate sheet 1. In order to improve releasing property of the transfer layer 5 from the substrate sheet 1, a releasing layer may be formed on the whole surface of the substrate sheet 1, and the resulting sheet material may be employed as the substrate sheet having releasing property. The releasing layer is released from the transfer layer 5 together with the substrate sheet 1 when the substrate sheet 1 is released after transfer, or after mold and simultaneous transfer.

As a raw material of the releasing layer, an epoxy resin-based releasing agent, epoxymelamine resin-based releasing agent, aminoalkyd resin-based releasing agent, melamine resin-based releasing agent, silicone resin-based releasing agent, fluorine resin-based releasing agent, cellulose derivative-based releasing agent, urea resin-based releasing agent, polyolefin resin-based releasing agent, paraffin-based releasing agent and composite-based releasing agent composed of them can be used. As a method for forming the releasing layer, wide variety of printing methods or coating methods may be employed.

A surface of the substrate sheet 1 may be finished as a mat surface. For example, a surface of the substrate sheet 1 may be embossed, or a releasing layer on the substrate sheet 1 may contain fine powder such as calcium carbonate, silica, zinc oxide, magnesium carbonate, polyethylene wax, glass beads. When the resulting substrate sheet is used and released after transfer material 6 is adhered onto molded article 7, small roughness formed on the releasing surface of the substrate sheet is copied on a surface of the transfer layer 5 to obtain a molded article having a mat surface.

A substrate sheet may have a layer for forming a mat surface. The layer may be partially placed on a surface of the substrate sheet (The layer is hereinafter referred to as "a partial matting layer"). By releasing the partial matting layer from transfer layer 5 together with the substrate sheet 1, a molded article partially having a mat surface may be obtained. In order to form the partial matting layer, the materials described for forming the releasing layer optionally mixed with above-described fine powder may be employed. The partial matting layer may be formed by using wide variety of printing methods.

The partial matting layer preferably comprises an epoxide resin, a melamine resin, the copolymer or the mixture thereof as a main component, and an acidic catalyst such as paratoluenesulfonic acid. Such a material dries easily, and the partial matting layer may be formed by inline printing process together with a protecting printed layer and an additional printed layer.

The protecting printed layer 2 is composed of an active energy ray curable resin composition. It is the layer for protecting molded article 7, and picture printed layer 3 against a chemical or abrasion after irradiation with an active energy ray. A polymer employed for preparing the protecting printed layer 2 in the present invention has a specific compounding in order to achieve the required chemical and physical properties. That is, the polymer used for the protecting printed layer 2 has (meth)acrylic equivalent weight from 100 to 300 g/eq, preferably from 150 to 300 g/eq, in view of curing property on irradiation with an active energy ray. When the (meth)acrylic equivalent weight is more than 300 g/eq, abrasion resistance after irradiation with active energy ray is insufficient, and the polymer having a (meth)acrylic equivalent weight of less than 100 g/eq is difficult to be obtained. The hydroxyl value of the polymer is from 20 to 500, preferably from 100 to 300, in view of reactivity with the polyfunctional isocyanate used together. When the hydroxyl value is less than 20, reactivity with the polyfunctional isocyanate becomes insufficient, and the heat crosslinking degree of the protecting printed layer 2 of the transfer material 6 prior to irradiation with an active energy ray is low. Therefore, stickiness remains or solvent resistance is poor. Further, the polymer having a hydroxyl value of over 500 is difficult to be obtained.

The weight-average molecular weight of the polymer is from 5000 to 50000, preferably from 8000 to 40000. When the weight-average molecular weight of the polymer is less than 5000, stickiness remains on the protecting printed layer 2 of the transfer material 6 prior to irradiation with an active energy ray or solvent resistance is poor. Further, when over 50000, viscosity of the resin becomes too high, and applying workability of the ink becomes poor.

The production method of the polymer is not particularly restricted, and conventionally known methods can be employed. For example, there are a method [1] in which a (meth)acryloyl group is introduced into a part of side chains of a polymer having a hydroxyl group, a method [2] in which an α, β-unsaturated monomer having a hydroxyl is subjected to a condensation reaction with a copolymer having a carboxylic group, a method [3] in which an α, β-unsaturated monomer having an epoxy group is subjected to an addition reaction with a copolymer having a carboxylic group, and a method [4] in which an α, β-unsaturated carboxylic acid is reacted with a polymer having an epoxy group.

The production method of the polymer used in the present invention will be specifically described using as an example the method [4]. For example, the polymer used in the present invention can be obtained by a method in which a polymer having a glycidyl group is reacted with an α, β-unsaturated carboxylic acid such as acrylic acid or the like.

The preferable polymer having a glycidyl group is, for example, a homopolymer of glycidyl (meth)acrylate and a copolymer of glycidyl (meth)acrylate and an α, β-unsaturated monomer having no carboxyl group.

As this α, β-unsaturated monomer having no carboxyl group, various (meth)acrylates, styrene, vinyl acetate, acrylonitrile and the like can be exemplified. If an α, β-unsaturated monomer having carboxyl group is used, crosslinkage is formed on the copolymerization reaction with glycidyl (meth)acrylate, increasing in viscosity and gelling are caused, and therefore it is not preferable.

When the polymer is prepared according to the process [1] to [4], it is necessary to appropriately set conditions such as the kind of the monomer used, the kind of the polymer and the amounts used thereof, so as to suffice the above-described numerical value restriction ranges regarding to the polymer. Such procedure is known to those skilled in the art.

As the polyfunctional isocyanate to be employed for preparing an active energy ray curable resin composition in the present invention, is not limited to, and known various isocyanates can be used. For example, isophorone diisocyanate, xylylene diisocyanate, hydrogenated xylylene diisocyanate, tolylene diisocyanate, diphenylmethane diisocyanate, 1,6-hexane diisocyanate, a trimer of the above described isocyanates, a prepolymer obtained by the reaction of polyfunctional alcohol and the above described diisocyanate and the like can be used.

The reason why the polyfunctional isocyanate and the polymer are polyadded in the present invention, is for keeping stickiness of the protecting printed layer 2 prior to irradiation with an active energy ray low, and for providing resistance to the solvent which is contained in the ink of the picture printed layer 3 and the adhesive printed layer 4 laminated on the protecting printed layer 2 in the case of heat transfer material 6. That is, a hydroxyl group contained in the polymer is reacted with an isocyanate group of the polyfunctional isocyanate to form a slightly crosslinked compound, which has the above-described properties.

The reaction ratio of the polymer to the polyfunctional isocyanate have to be determined so that the urethane bond amount of the reaction product obtained by the poly-addition reaction becomes 6000 to 50000 g/eq, preferably 8000 to 30000 g/eq. If the urethane bond amount is less than 6000 g/eq, crosslinkage proceeds to much during the poly-addition reaction, the reaction product becomes gel, and the resulting varnish becomes heterogeneous. Whereas, the urethane bond amount is more than 50000 g/eq, crosslinkage becomes insufficient, stickiness remains, and solvent resistance becomes poor. Thereby, it becomes difficult to obtain transfer material 6 according to an inline printing process by using the conventional multi-colour rotogravure printing apparatus.

The present invention is characterized in that the protecting printed layer 2 is provided from a resin composition which is composed of an active energy ray curable resin composition comprising a reaction product of poly-addition reaction between the polymer and the polyfunctional isocyanate which is reacted prior to printing the protecting printed layer. The protecting printed layer 2 composed of an active energy ray curable resin composition is tack-free without conducting a specific drying step. Therefore, an additional layer may be printed on the protecting printed layer 2, or a transfer material having the protecting printed layer 2 may be wound up. The protecting printed layer do not have to be printed nor dried by using a separate apparatus, and it may be printed and dried according to the procedure which is same as that for the other printed layers by the process of inline printing procedure such as a conventional multi-colour rotogravure printing apparatus, to produce a transfer material, or a surface protecting sheet excellent in abrasion resistance and chemical resistance.

The active energy ray curable resin composition employed for the protecting printed layer 2 of the present invention comprises an ethylenically unsaturated group. When the active energy ray curable resin composition is exposed to an active energy ray after transfer, the ethylenically unsaturated group is polymerized, and the active energy ray curable resin composition is crosslinked.

The active energy ray curable resin composition used for the protecting printed layer 2 may optionally contain a component such as a reactive diluting monomer, a solvent and a coloring agent, in addition to the reaction product obtained by polyaddition of the polymer and the polyfunctional isocyanate. When an electron beam is used in active energy ray irradiation, sufficient crosslinking and curing can be obtained without using a photopolymerization initiator. On the other hand, when ultraviolet ray is used, it is necessary to add known various photopolymerization initiators.

The active energy ray curable resin composition used for the protecting printed layer 2 may optionally contain a lubricant. The reason for this is that the addition of the lubricant makes a surface of the protecting printed layer 2 rough, therefore, a sheet material (a transfer material or a surface protecting sheet) having the protecting printed layer becomes easy to be rolled as a sheet, and the sheet becomes hard to be blocked. The lubricant also can increase resistance against rubbing or scratching. As the lubricant, for example, wax such as polyethylene wax, paraffin wax, synthesized wax and montan wax, and a synthetic resin such as a silicone-based resin and a fluorine-based resin can be employed. The lubricant is contained in an amount of from 0.5 to 15% by weight, preferably from 1 to 6% by weight. When the amount of the lubricant is less than 0.5% by weight, the effects of prevention of blocking and resistance to rubbing and scratching become poor. When more than 15% by weight, transparency of the protecting printed layer 2 becomes extremely poor.

Furthermore, the active energy ray curable resin composition used for the protecting printed layer 2 may contain an ultraviolet absorber in order to improve light resistance. Although various ultraviolet absorbers can be used, especially, hydroxyphenylbenzotriazole represented by the formula:

hydroxyphenyl-S-triazine represented by the formula:

the compound (MBEP) represented by the formula:

and 2-(2'-hydroxy-5'-methacryloxyethylphenyl)-2H-benzotriazole represented by the formula:

are preferably employed. When such compounds are used as the ultraviolet absorber, ultraviolet-absorbing property (light resistance) of the protecting printed layer 2 is better than that achieved when the other ultraviolet absorbers are contained. The ultraviolet absorbers of the foregoing formulae also have good compatibility with the active energy ray curable resin composition, they can be contained in a large amount while maintaining abrasion resistance and transparency of the protecting printed layer 2.

The picture-printed layer 3 is a layer for decorating a surface of the molded article 7. As a materials of the picture-printed layer 3, a coloring ink which contains a resin, for example, a polyvinyl-based resin, a polyamide-based resin, a polyester-based resin, a polyacryl-based resin, a polyurethane-based resin, a polyvinyl acetal-based resin, a polyesterurethane-based resin, a cellulose ester-based resin and an alkyd resin as a binder, and pigment or dye having a suitable color as a coloring agent may be used.

The adhesive printed layer 4 is a layer for adhering the foregoing respective layers to a surface of the molded article 7. As the adhesive printed layer 4, a heat-sensitive or pressure-sensitive resin suitable for the material of the molded article 7 is appropriately used. For example, when the material of the molded article 7 is a polyacryl-based resin, a resin such as a polyacryl-based resin may preferably be used. Further, when the material of the molded article 7 is a polyphenylene oxide-polystyrene-based resin, a polycarbonate-based resin, a styrene-based copolymer resin or a polystyrene-based blended resin, the resin which has affinity with the above-listed resins, such as a polyacryl-based resin, a polystyrene-based resin and a polyamide-based resin may be employed. Furthermore, the material of the molded article 7 is a polypropylene resin, a resin such as a chlorinated polyolefin resin, a chlorinated ethylene-vinyl acetate copolymer resin, a cycled rubber and cumarone-indene resin can be used.

Figure 2:
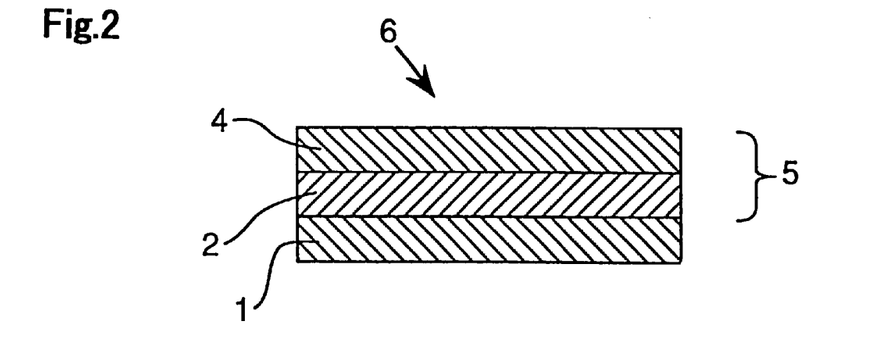
FIG. 2 is a schematic sectional view which shows another example of the transfer material according to the present invention.

Construction of transfer layer 5 is not restricted to the above described embodiments. For example, when transfer material 6 which aims only at surface protection, and background patterns or transparency of molded article 7 is intended to use, it is possible that protecting printed layer 2 and thereafter adhesive printed layer 4 are formed on substrate sheet 1 as described above, and picture printed layer 3 is omitted from transfer layer 5 as shown in FIG. 2.

An anchor layer may be provided between the respective layers which constitute transfer layer 5. The anchor layer is a resin layer for enhancing adhesiveness between the respective layers which constitutes the transfer layer 5, or for protecting molded article 7 or picture-printed layer 3 from chemicals. For example, a two-pack curable urethane resin, a melamine-based or an epoxy-based thermocurable resin and a thermoplastic resin such as a vinyl chloride copolymer resin can be used.

A method for producing a molded article of the present invention excellent in abrasion resistance and chemical resistance by using the transfer material 6 which has the above described layer-constitution will be described below.

Figure 3:
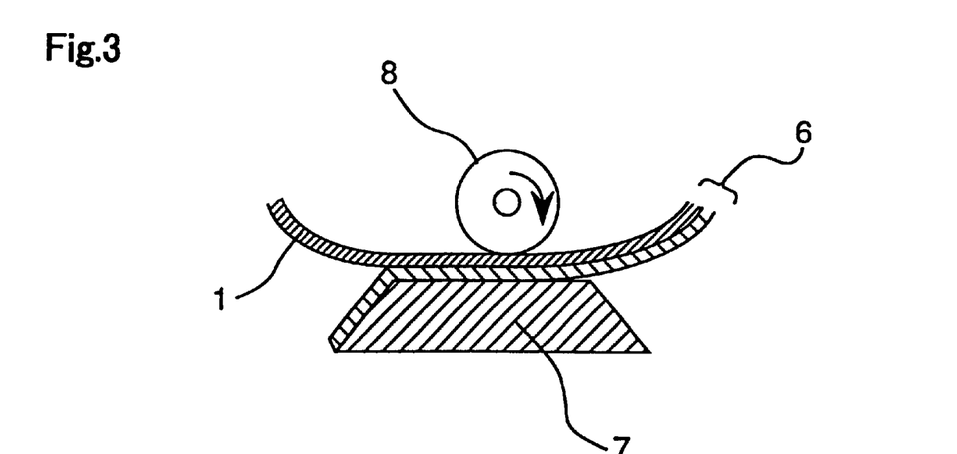
FIG. 3 is a schematic view which shows one example of a production process for a molded article excellent in abrasion resistance and chemical resistance using the transfer material according to the present invention.

First, as shown in FIG. 3, transfer material 6 is placed on molded article 7 with adhesive printed layer 4 thereof facing the molded article (below). By using a transferring machine such as a roll transferring machine equipped with heat resistant rubber-like elastomer 8, for example silicone rubber, and an up-down transferring machine, heat and/or pressure is applied to transfer material 6 from the side of the substrate sheet 1 through heat resistant rubber-like elastomer 8 at the conditions of a temperature of from about 80 to about 260° C. and a pressure of from about 50 to about 200 kg/m$^2$.

According to the procedure, adhesive printed layer 4 is adhered to a surface of molded article 7. Then, substrate sheet 1 is pulled after cooling, peeling occurs in the boundary surface between substrate sheet 1 and protecting printed layer 2. In the case of a releasing layer is provided on substrate sheet 1, when substrate sheet 1 is pulled, peeling occurs in the boundary surface between the releasing layer and protecting printed layer 2. Finally, an active energy ray is irradiated to crosslink and cure protecting printed layer 2 transferred to molded article 7. The step of irradiation with an active energy ray may be conducted prior to the step of peeling substrate sheet 1.

As the active energy ray, an electron beam, an ultraviolet ray, a γ-ray and the like can be used. The irradiation condition may be determined according to the kind of the active energy ray curable resin composition.

Regarding the molded article 7, though the material thereof is not limited to, there can be exemplified in particular a resin molded article, an woody article and a composite article thereof. Examples of the resin include a general-purpose resin such as a polystyrene-based resin, a polyolefin-based resin, ABS resin, AS resin, AN resin. There can be also used a general-purpose engineering resin such as a polyphenylene oxide-polystyrene-based resin, a polycarbonate-based resin, a polyacetal-based resin, an acryl-based resin, a polycarbonate modified polyphenylene ether resin, a polyethylene terephthalate resin, a polybutylene terephthalate resin and an ultra high molecular weight polyethylene resin, and a super engineering resin such as a polysulfone resin, a polyphenylene sulfide-based resin, a polyphenylene oxide-based resin, a polyacrylate resin, a polyether imide resin, a polyimide resin, a liquid crystal polyester resin and a polyallyl-based resin. Further, a composite resin containing a reinforcing material such as a glass fiber and an inorganic filler can also be used.

Figure 4:
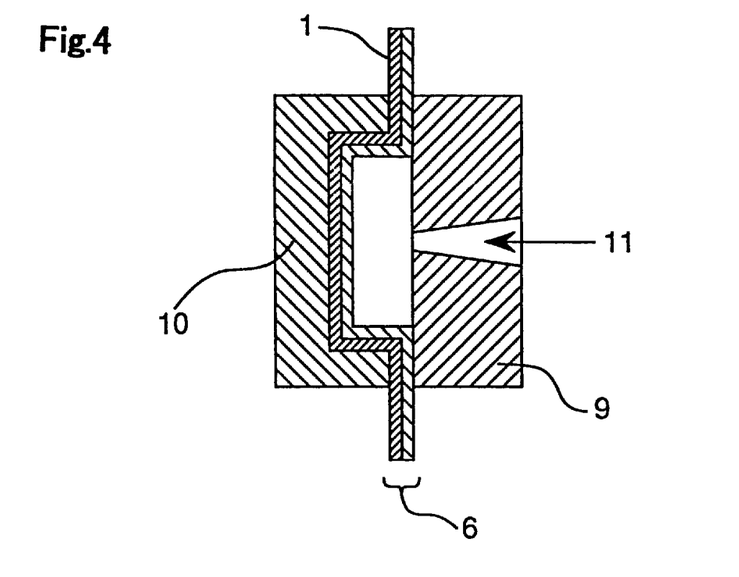
FIG. 4 is a schematic view which shows another example of a production process for a molded article excellent in abrasion resistance and chemical resistance using the transfer material according to the present invention.

Next, a method for providing abrasion resistance and chemical resistance to a surface of resin molded article 7 by a simultaneous molding and transferring method utilizing injection molding, using the above described transfer material 6, as shown in FIG. 4, will be described. First, transfer material 6 is fed into a mold comprising movable mold 9 and fixed mold 10 with the transfer layer 5 facing the inside, in other words, with substrate sheet 1 contacting with fixed mold 10. After closing the mold, molten resin 11 is injected into the mold through a gate provided in movable mold 9 to fill the mold, and molded article 7 is formed and simultaneously transfer material 6 is adhered to its surface. After cooling resin molded article 7, the mold is opened and resin molded article 7 is taken out. Finally, substrate sheet 1 is peeled off, and then protecting printed layer 2 is crosslinked and cured by irradiation with an active energy ray. Otherwise, substrate sheet 1 may be peeled off after irradiation with an active energy ray.

Figure 5:
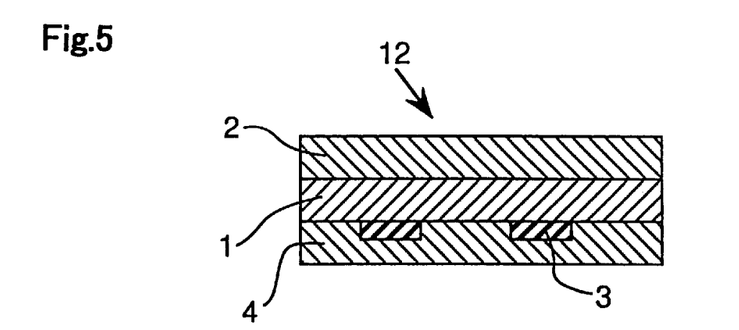
FIG. 5 is a schematic sectional view which shows one example of the surface protecting sheet according to the present invention.
Figure 6:
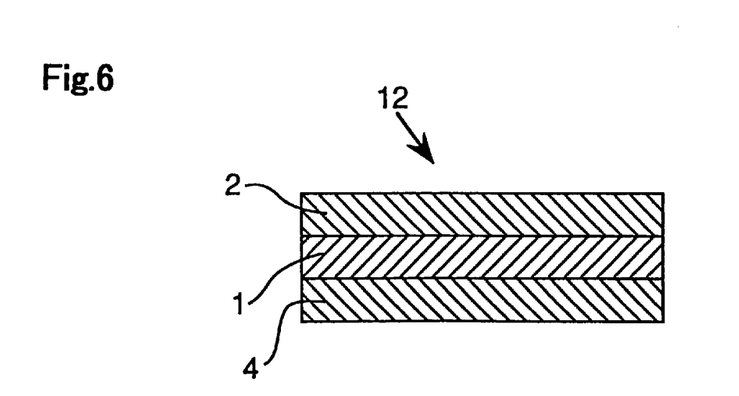
FIG. 6 is a schematic sectional view which shows another example of the surface protecting sheet according to the present invention.

As another embodiment of the present invention, there is another method in which a molded article excellent in abrasion resistance and chemical resistance is produced using surface protecting sheet 12. In this method, as shown in FIG. 5, surface protecting sheet 12 comprising substrate sheet 1 having no releasing property, protecting printed layer 2 provided on one surface of the substrate sheet and another printed layer, such as picture-printed layer 3 or adhesive printed layer 4, provided on the opposite surface of the substrate sheet is used. Surface protecting sheet 12 is produced using the same procedure and material as transfer material 6 except that a material having no releasing property is used as substrate sheet 1 and neither picture-printed layer 3 nor adhesive printed layer 4 is formed on protecting printed layer 2. As substrate sheet 1 having no releasing property, a sheet of resin, such as an acryl-based resin, a polycarbonate-based resin, a vinyl chloride-based resin, an urethane-based resin and a polyester-based resin, can be used. When surface protecting sheet 12 aims only at surface protection, or when background patterns or transparency of molded article 7 is intended to use, the picture-printed layer 3 can be omitted as shown in FIG. 6. When substrate sheet 1 and picture-printed layer 3 have satisfactory adhesiveness to molded article 7, adhesive printed layer 4 is not necessary to be provided.

Figure 7:
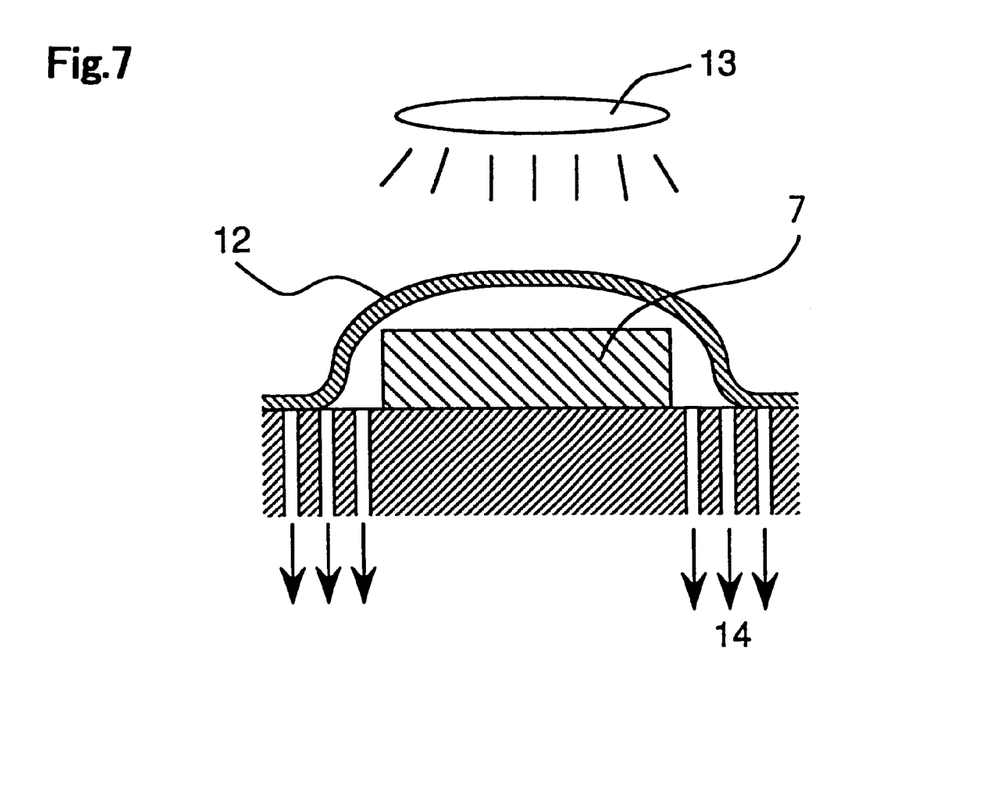
FIG. 7 is a schematic view which shows one example of a production method for a molded article excellent in abrasion resistance and chemical resistance according to the present invention.

A method for providing abrasion resistance and chemical resistance to a surface of molded article 7 using surface protecting sheet 12 excellent in abrasion resistance and chemical resistance as shown in FIG. 7, will be described below. First, surface protecting sheet 12 is placed on a surface of molded article 7 with adhesive printed layer 4 facing downward. Then, after heating and softening substrate sheet 1 using heater 13 or the like, vacuum suction 14 is conducted from the downward direction. By this procedure, adhesive printed layer 4 is adhered to a surface of the molded article 7. Finally, protecting printed layer 2 is crosslinked and cured by irradiating with an active energy ray. Otherwise, substrate sheet 1 may be applied pressure from the upper side while being subjected to vacuum-suction 14 from the downward direction. Pressure to surface protecting sheet 12 can be applied directly or via a flexible sheet using a liquid or the like.

Figure 8:
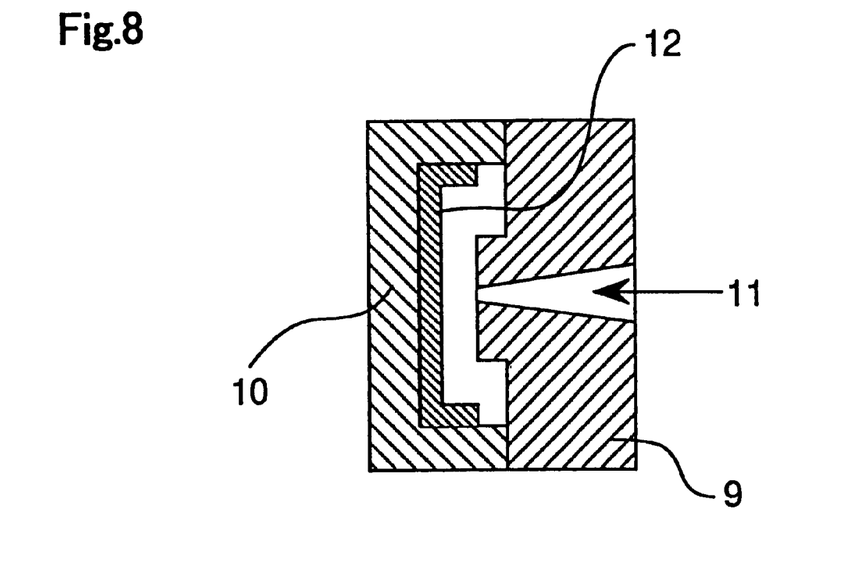
FIG. 8 is a schematic view which shows another example of a production method for a molded article excellent in abrasion resistance and chemical resistance according to the present invention.

Furthermore, using surface protecting sheet 12 excellent in abrasion resistance and chemical resistance, a surface of resin molded article 7 can be provided abrasion resistance and chemical resistance by utilizing a method in which molding by injection molding and printing are simultaneously performed (that is, insert molding method), as shown in FIG. 8. First, surface protecting sheet 12 is fed into the mold comprising movable mold 9 and fixed mold 10 while protecting printed layer 2 being in contact with fixed mold 10. After closing the mold, molten resin 11 is injected into the mold through a gate provided in movable mold 9 to fill the mold, and molded article 7 is formed and simultaneously surface protecting sheet 12 is adhered to its surface. After cooling the molded article 7, the mold is opened and resin molded article 7 is taken out. Finally, protecting printed layer 2 is crosslinked and cured by irradiating with an active energy ray.

EXAMPLES

The present invention will be further specifically described by the following examples and comparative examples, however, the present invention is not restricted to them. In the examples, all "parts" and "%" are by weight.

Example 1

A polyester resin film having thickness of 38 μm was used as a substrate sheet. A releasing layer composed of a melamine resin-based releasing agent, a protecting printed layer produced by compounding 5 parts of a photopolymerization initiator (trade name: Irgacure 184, manufacture by Chiba-Geigy Co.,Ltd.) based on 200 parts (solid content: 100 parts) of varnish A described below, a picture printed layer using acyl-based ink, and an adhesive printed layer composed of an acrylic resin were formed on one surface of the substrate sheet by using a gravure printing method.

The varnish A was obtained in the following method. First, into a reacting apparatus equipped with a stirring apparatus, cooling tube, dropping funnel and nitrogen introducing tube were charged 250 parts of glycidyl methacrylate (hereinafter, referred to as GMA), 1.3 parts of lauryl mercaptan, 1000 parts of butyl acetate and 7.5 parts of 2.2'-azobisisobutyronitrile (hereinafter, referred to as AIBN), and they were heated until the temperature in the content rose to about 90° C. under nitrogen flow over 1 hour and kept at this temperature for 1 hour.

Then, a mixture composed of 750 parts of GMA, 225 parts of methyl methacrylate (hereinafter, referred to as MMA), 3.7 parts of lauryl mercaptan and 22.5 parts of AIBN was dropped from a dropping funnel into the reacting apparatus over about 2 hours under nitrogen flow, and kept at the temperature for 3 hours. To this was added 10 parts of AIBN and the mixture was kept at the temperature for 1 hour. Then, the mixture was heated up to 120° C., and kept at the temperature for 2 hours. After cooling to 60° C., the nitrogen introducing tube was changed to an air introducing tube, and 507 parts of acrylic acid (hereinafter, referred to as AA), 2.0 parts of methoquinone and 5.4 parts of triphenylphosphine were charged and mixed, then, the mixture was heated to 110° C. under air bubbling. The mixture was kept at the same temperature for 8 hours, then, 1.4 parts of methoquinone was charged. The mixture was cooled, and to this was added methyl ethyl ketone until the nonvolatile content reached to 50%. The polymer contained in the varnish obtained had an acryl equivalent weight of 214 g/eq, a hydroxyl value of 262 and weight-average molecular weight (in terms of styrene by GPC) of 20000. Further, to this system was added 15.1 parts of hydrogenated xylylene diisocyanate (trade name: Takenate 600, manufactured by Takeda Chemical Industries, Ltd.) and 15.1 parts by methyl ethyl ketone, and the mixture was kept at 80° C. for 2 hours for poly-addition reaction, to obtain varnish A. The urethane bond amount in this reaction product corresponded to 9677 g/eq.

This transfer material was adhered to a surface of a molded article by using an insert molding method, then, the substrate sheet was peeled, and ultraviolet ray was irradiated to completely cure the protecting printed layer. The molding conditions included a resin temperature of 220° C., a mold temperature of 55° C., and a resin pressure of about 300 kg/cm². The raw material of the molded article was an polycarbonate resin, and it was molded into a tray-shaped article having a longitudinal length of 95 mm, a transverse length of 65 mm, a rising edge height of 4.5 mm and R at the corner part of 2.5 mm. Irradiation conditions included 120 W/cm, one lamp, a lamp height of 10 cm and an irradiation time of 6 seconds.

Example 2

The same procedure was conducted as in Example 1 except that varnish B was used instead of the varnish A of Example 1. The varnish B was prepared by using 15.1 parts of 1,6-hexane diisocyanate trimer (trade name: Coronate HX, manufactured by Nippon Polyurethane Industries K.K.) instead of 15.1 parts of hydrogenated xylylene diisocyanate of Example 1.

Example 3

The same procedure was conducted as in Example 1 except that a partial matting layer was formed between the releasing layer and the protecting printed layer by using a methyl ethyl ketone solution of an epoxy-melamine resin containing silica particles and 5% paratoluenesulfonic acid as an acidic catalyst, according to the inline printing procedure in the same manner as in the protecting printed layer.

Comparative Example 1

The same procedure was conducted as in Example 1 except that the varnish prior to conducting poly-addition reaction with hydrogenated xylylene diisocyanate was used.

Comparative Example 2

The same procedure was conducted as in Example 1 except that 30.1 parts of hydrogenated xylylene diisocyanate was used instead of 15.1 parts of Example 1. The urethane bond amount in the reaction product in this case was calculated, and it corresponds to 4902 g/eq.

Evaluation of Performance

Performance for inline property, chemical resistance, abrasion resistance, and cracking or not, were evaluated regarding the products in examples 1, 2, and comparative examples 1, 2 (Table 1).

The inline property was evaluated in terms of

○: excellent or

X: poor, judged by whether the printed layer is dried or not on finger touch prior to printing the next layer, and whether the next layer causes back trap or not, and the like.

The chemical resistance was evaluated in terms of

○: no change or

X: change, judged by visual inspection of the surface after reciprocal abrading for 50 times run, by using a gauze impregnated with methanol.

The abrasion resistance was evaluated in terms of

○: excellent or

X: poor, judged by visual inspection of the surface after reciprocal abrading for 200 times run at 2 reciprocation/second and a movement distance of 2 cm, by using 1 cm square #000 steel wool loaded 100 g, or 300 g.

The cracking or not was evaluated in terms of

○: no cracking or

X: cracking, judged by visual inspection of curved surface of a molded article.

TABLE 1

| | Inline property | Chemical resistance | Abrasion resistance 100 g | Abrasion resistance 300 g | Cracking or not |
|---|---|---|---|---|---|
| Example 1 | ○ | ○ | ○ | ○ | ○ |
| Example 2 | ○ | ○ | ○ | ○ | ○ |
| C.Ex. 1 | X | ○ | ○ | ○ | ○ |
| C.Ex. 2 | Cannot evaluated | — | — | — | — |

The following are evident from the evaluation results of Table 1. The transfer materials of Examples 1 and 2 having a protecting printed layer composed of an active energy ray curable resin composition which comprises as an effective ingredient a reaction product having an urethane bond amount from 6000 to 50000 g/eq, which is obtained prior to printing the protecting printed layer by poly-addition reaction of a polymer having a (meth)acryl equivalent weight from 100 to 300 g/eq, a hydroxyl value from 20 to 500 and a weight-average molecular weight from 5000 to 50000 with a polyfunctional isocyanate, were excellent in abrasion resistance and chemical resistance, and caused no crack in curved surface part of a molded article, and was excellent in inline property.

On the other hand, the transfer material of Comparative Example 1 was excellent in abrasion resistance, chemical resistance and no cracking, however, poor in inline property because the polymer and the polyfunctional isocyanate were not subjected to poly-addition reaction prior to printing the protecting printed layer.

Comparative Example 2 did not generate a homogeneous solution but generated a gellish substance because the urethane bond amount by poly-addition reaction of a polymer with a polyfunctional isocyanate was less than 6000 g/eq, and evaluation could not be conducted.

Effect of the Invention

The method for producing a molded article excellent in abrasion resistance and chemical resistance of the present invention uses a transfer material, or a surface protecting sheet, the protecting printed layer of which is composed of an active energy ray curable resin composition and this protecting printed layer formed on the surface of a molded article is crosslinked and cured by irradiation with an active energy ray. The method of the present invention therefore can provide a molded article excellent in abrasion resistance and chemical resistance, without causing crack in curved part of the molded article.

Further, the active energy ray curable resin composition comprises as an effective ingredient a reaction product having an urethane bond amount of from 6000 to 50000 g/eq, which is obtained prior to printing the protecting printed layer by poly-addition reaction of a polymer having a (meth)acryl equivalent weight from 100 to 300 g/eq, a hydroxyl value from 20 to 500 and a weight-average molecular weight from 5000 to 50000 with a polyfunctional isocyanate, and fluidity and stickiness are not remained on a protecting printed layer prior to irradiation with an active energy ray. In addition, especial drying for a protecting printed layer is not required. Therefore, there can be produced a transfer material and a surface protecting sheet excellent in abrasion resistance and chemical resistance by the process of inline printing procedure such as a conventional multi-colour rotogravure printing apparatus.

What is claimed is:

1. A transfer material excellent in abrasion resistance and chemical resistance which comprises a substrate sheet having releasing property, a protecting printed layer formed on a releasing surface of the substrate sheet, and at least one additional printed layer on the protecting printed layer, wherein the protecting printed layer consists of an active energy ray curable resin composition which comprises a reaction product having an urethane bond amount of from 6000 to 50000 g/eq as an effective ingredient, the reaction product being obtained by poly-adding a polymer having a (meth)acryl equivalent weight of from 100 to 300 g/eq, a hydroxyl value of from 20 to 500, and a weight-average molecular weight of from 5000 to 50000, to a polyfunctional isocyanate.

2. The transfer material excellent in abrasion resistance and chemical resistance according to claim 1, wherein the polymer is a reaction product of poly-addition reaction between glycidyl (meth)acrylate-based polymer, and α, β-unsaturated monocarboxylic acid.

3. The transfer material excellent in abrasion resistance and chemical resistance according to claim 2, wherein the glycidyl (meth)acrylate-based polymer is a homopolymer of glycidyl (meth)acrylate, or a copolymer of glycidyl (meth)acrylate and an α, β-unsaturated monomer having no carboxyl group.

4. The transfer material excellent in abrasion resistance and chemical resistance according to any one of claims 1 to 3, wherein the substrate sheet has a partial matting layer on the surface thereof, the partial matting layer comprising an epoxide resin, a melamine resin, the copolymer or the mixture thereof, as an effective ingredient, and comprising an acidic catalyst.

5. A method for producing a molded article excellent in abrasion resistance and chemical resistance comprising the steps of:
    adhering the protecting printed layer of the transfer material according to any one of claims 1 to 3 onto a surface of a molded article;
    releasing the substrate sheet; and
    irradiating with an active energy ray.

6. A method for producing a molded article excellent in abrasion resistance and chemical resistance comprising the steps of:
    placing the transfer material according to any one of claims 1 to 3 in a mold with the protecting printed layer thereof facing inside;
    injecting a resin into cavity for filling, molding and simultaneously adhering the protecting printed layer of the transfer material to the surface of the molded resin;
    releasing the substrate sheet; and
    irradiating with an active energy ray.

7. A surface protecting sheet excellent in abrasion resistance and chemical resistance which comprises a substrate sheet having no releasing property, a protecting printed layer formed on a surface of the substrate sheet, and at least one additional printed layer on the opposite surface of the substrate sheet, wherein the protecting printed layer consists of an active energy ray curable resin composition which comprises a reaction product having an urethane bond amount of from 6000 to 50000 g/eq as an effective ingredient, the reaction product being obtained by poly-adding a polymer having a (meth)acryl equivalent weight of from 100 to 300 g/eq, a hydroxyl value of from 20 to 500, and a weight-average molecular weight of from 5000 to 50000, to a polyfunctional isocyanate.

8. The surface protecting sheet excellent in abrasion resistance and chemical resistance according to claim 7, wherein the polymer is a reaction product of poly-addition reaction between glycidyl a (meth)acrylate-based polymer, and α, β-unsaturated monocarboxylic acid.

9. The surface protecting sheet excellent in abrasion resistance and chemical resistance according to claim 7, wherein the glycidyl (meth)acrylate-based polymer is a homopolymer of glycidyl (meth)acrylate, or a copolymer of glycidyl (meth)acrylate and an α, β-unsaturated monomer having no carboxyl group.

10. A method for producing a molded article excellent in abrasion resistance and chemical resistance comprising the steps of:
    placing the surface protecting sheet according to any one of claims 7 to 9 on the surface of a molded article;

heating and softening the surface protecting sheet;

vacuum attracting the protecting sheet from the downward direction to adhere the surface protecting sheet onto a surface of the molded article; and irradiating with an active energy ray.

11. A method for producing a molded article excellent in abrasion resistance and chemical resistance comprising the steps of:

placing the surface protecting sheet according to any one of claims 7 to 9 in a mold with the protecting printed layer thereof facing outside;

injecting a resin into cavity for filling, molding and simultaneously adhering the surface protecting sheet to the surface of the molded resin; and irradiating with an active energy ray.

12. A method for producing a molded article excellent in abrasion resistance and chemical resistance comprising the steps of:

adhering the protecting printed layer of the transfer material according to claim 4 onto a surface of a molded article;

releasing the substrate sheet; and irradiating with an active energy ray.

13. A method for producing a molded article excellent in abrasion resistance and chemical resistance comprising the steps of:

placing the transfer material according to claim 4 in a mold with the protecting printed layer thereof facing inside;

injecting a resin into cavity for filling, molding and simultaneously adhering the protecting printed layer of the transfer material to the surface of the molded resin;

releasing the substrate sheet; and irradiating with an active energy ray.

* * * * *